(12) United States Patent
Niinivaara

(10) Patent No.: US 6,216,724 B1
(45) Date of Patent: Apr. 17, 2001

(54) SAFETY VALVE

(75) Inventor: Juhani Niinivaara, Koria (FI)

(73) Assignee: AB Grundstenen (Metal Patent WHSS AB), Haparanda (SE)

( * ) Notice: Subject to any disclaimer, the term of this patent is extended or adjusted under 35 U.S.C. 154(b) by 0 days.

(21) Appl. No.: 09/494,159

(22) Filed: Jan. 31, 2000

Related U.S. Application Data

(63) Continuation of application No. PCT/FI98/00610, filed on Aug. 3, 1998.

(30) Foreign Application Priority Data

Aug. 1, 1997 (FI) ........................................... 973188

(51) Int. Cl.$^7$ ............................. F16K 13/08; F16L 37/28; F16L 41/04; F16L 55/105; B08B 9/023
(52) U.S. Cl. ............................. 137/318; 137/242; 138/89; 138/97; 251/205; 251/249.5; 251/901; 15/104.04
(58) Field of Search ......................................... 137/242, 317, 137/318; 138/89, 97; 251/205, 901, 248, 249.5, 129.11, 58; 15/104.04

(56) References Cited

U.S. PATENT DOCUMENTS

| | | | |
|---|---|---|---|
| 2,784,740 | * 3/1957 | Stageberg | 251/901 |
| 3,334,656 | * 8/1967 | Boyle | 251/901 |
| 3,726,313 | * 4/1973 | Pandya | 137/872 |
| 4,438,781 | * 3/1984 | Brenholt | 137/625.28 |
| 4,830,041 | 5/1989 | Sadowski et al. | 137/317 |

FOREIGN PATENT DOCUMENTS

| | | | |
|---|---|---|---|
| 2256149 | * 3/1974 | (DE) | 251/901 |
| 2 674 312 | 9/1992 | (FR) . | |
| 2 677 732 | 12/1992 | (FR) . | |

OTHER PUBLICATIONS

Nov. 1998, International Search Report for PCT/fi98/00610.

* cited by examiner

*Primary Examiner*—George L. Walton
(74) *Attorney, Agent, or Firm*—Altera Law Group, LLC

(57) ABSTRACT

A safety valve to stop flow in the flow pipe (3), the safety valve including a drilling device (8) with its frame (6) to drill a hole in the flow pipe, a winding device (7) fixed to the frame of the drilling device and a band (4) wound with a winding device. The safety valve includes a sleeve to which sleeve a drilling device (8) and a winding device (7) have been fixed and the sleeve has been equipped with systems to fix it to the outside surface of the pipe (3).

16 Claims, 6 Drawing Sheets

SAFETY VALVE

This application is a continuation of international application serial number PCT/FI98/00610, filed Aug. 3, 1998.

FIELD OF THE INVENTION

The subject of the invention is the safety valve. The valve can be used to block flow pipes at the required spot in cases of accidents or other situations where speed is necessary. The safety valve is based on winding a band through a hole made in the pipe to form a reel of band filling the inner diameter of the pipe with the view to blocking the flow.

DESCRIPTION OF RELATED ART

The safety valve can be used particularly in oil and gas fields, where pipes are used to transport liquid/gas for example to refineries or ports etc. The bursting of such a pipe for any reason always creates the risk of an environmental disaster. Also long pipes often do not have valves at sufficiently frequent distances so the only possibility to stop the substance in the pipe from spilling into the environment is to block the pipe quickly with the safety valve presented in this invention. The safety valve can be flown to the site for example by helicopter to be connected to the pipe to be blocked. Naturally the invention can also be used to block other types of pipes.

In the valves presently being used, which are based on winding bands, the pipe has a tendency to flatten when a hole is made in it. Additionally when the band is wound against the inner surface of the pipe the moment caused against the wall of the pipe by the friction of the band is directed through the frame of the winding device to the hole in the pipe, which tends to further change the shape of the pipe. Changes in the shape of the pipe cause gaps between the pipe and the reel of band and thus leaks.

In the apparatus being presently sealing the hole is inefficient or nonexistent, because large flows of liquied and/or high pressures would require a firm frame, against which the seals could be supported. Thus oil, gas or other substance often leaks from the hole, and trying to prevent this substance from ending up in the environment or being wasted is the purpose of the safety valve.

Big oil and gas pipes are often constructed above ground where they are exposed to winds and storms thus making them often considerably dirty or even covered in snow and ice. Even if the pipes are dug into the ground they are dirty when dug up. Dirty pipes are hard to seal as dirt often ends up between the seal and the pipe. Additionally when a hole is made in the side of the pipe solid impurities, such as gravel and/or sand, may easily end up in the pipe, which may cause problems when the impurities are transported by the flow for example to a pump station or corresponding plant.

When the band is wound into a roll inside the pipe, the pressure in the pipe tends to separate the bands and make gaps in between, to push over the roll of band and to bend it causing the threat of leaks, or even the whole plug may begin to open. This is a problem especially when blocking pipes with a large diameter and when using a relatively small hole in relation to the diameter of the pipe when the band is narrow and the width of the roll of band is small.

SUMMARY OF THE INVENTION

The purpose of the invention is to eliminate the above problems.

The safety valve consists of a drilling device and its frame for the purpose of drilling a hole in the flow pipe, a winding device fixed to the frame of the drilling device and a band which is reeled with the winding device. Additionally the device of this invention includes a sleeve to which sleeve a drilling device and a winding device have been connected and the sleeve is equipped with a system to fix it to the outer surface of the pipe.

The operation of the drilling device and the winding device is already familiar so they are not described in detail in the explanation.

The sleeve includes equipment to fix the safety valve to the pipe so that the winding and drilling device can be sealed to the pipe and drilled into the pipe. Advantageously the sleeve has been designed so that the sleeve supports both the winding device and the drilling device as well as the pipe.

Advantageously the sleeve consists of two semicircular fixing shoes, which are connected to each other by means of a joint so they turn to be fixed to form a circle around the pipe. The fixing shoes have been dimensioned with the size of the pipe in question in mind so that their diameter equals the outside diameter of the pipe. The fixing shoes are equipped with a power device, which squeezes the shoes tightly around the pipe. The power device can, for example, be a hydraulic cylinder.

In one application of the safety valve a hole has been made in the sleeve and a cup formed around the hole so that the drilling device can be drilled through the wall of the pipe and also through the opposite wall making it possible to push the drilling device into the cup and the frame of the drilling device forms a bar supporting the roll of band resting in two places on the wall of the pine and the sleeve.

In accordance with one application of the invention a cleaning device has been fixed to the sleeve, its purpose being to clean off dirt etc. from the outer surface of the pipe so that the sleeve fits tightly onto the surface of the pipe and so that the sealing of the drilled holes will be tight. The cleaning device consists of a cleaning surface or surfaces and a drive mechanism to move the cleaning surfaces around and against the pipe.

In one application of the safety valve the cleaning surfaces are placed against the inner surfaces of the fixing shoes in special threads reserved for the cleaning surfaces. The drive mechanism includes an operating motor to turn the cog and a tooth ring surrounding the cleaning surfaces. The drive mechanism turns the tooth ring with the cog and thus also the cleaning surfaces. The cleaning surfaces revolve around the pipe cleaning its surface and at the same time turn round from under the fixing shoes along the threads. When the cleaning surfaces have turned round from under the shoes the fixing shoes are pressed together to form a sleeve tightly against the pipe.

The cleaning surfaces can also be placed on the inner surfaces of the fixing shoes, for example, so that the drive mechanism turns them along the inner surface of the fixing shoes thus cleaning the pipe and finally ending in a spce reserved for them, which can be for example a slot in the inner surface of the fixing shoe.

In one application of the safety valve the device includes a supporting system to support the roll of band from the oposite side of the pipe's pressure side. The support system is advantageously a pin-like system, which is placed inside the pipe against the roll of band on the opposite side from its pressure side.

In one application of the safety valve the support system is connected by a joint to the frame of the drilling device and it has a power device, which is used to turn it out to form a support transverse to the pipe and the frame of the drilling device, when the frame of the drilling device is pushed into the pipe.

In one application of the safety valve the support system has a drilling system to drill the support system into the pipe. This can be drilled for example at the same time as the hole for the winding device.

In one application of the safety valve the support system is a pin-like system, which can be pushed forward telescopically and it is on the frame of the drilling device. The device includes a power device with a support system fixed to it and which can be used to push out the support system.

There may be one or more support systems, essentially the support system supports the roll of band from the opposite side in relation to pressure preventing it from bending and/or being displaced. The power devices of the support systems can be for example hydraulic or electrical.

The band used in the winding device can be any generally used band, for example the band can be hollow in which case glue or some sealing substance for example can be pumped into it to seal the gaps in the roll and gaps between the band and the inner surface of the pipe. The band may have holes in it through which the substance being pumped will be squeezed out.

In one application of the safety valve the band is hollow and flat and a sealing flange has been formed on at least the other of its edges, its purpose being that it will press against the roll of band sealing the gaps between the rolls of the band. The flange can be of the same material as the rest of the band or of an other material.

The sleeve of the invention protects the pipe from being flattened and/or from changing its shape when the pipe is drilled or pressed in some other way, or when the roll of band is being wound into the pipe. Additionally the sleeve offers an excellently firm frame to which a winding and drilling device and their frame can be connected. Also the sealing of the device against the pipe can easily be done through the sleeve. Additionally a reliable and secure sleeve offers the possibility of leaving the safety valve in place for a longer period of time, which may be necessary during extensive repair work or for example if one wishes to seal the holes in the pipe made by the safety valve by leaving the sleeve in place. Additionally it is easy to install the sleeve say from a helicopter by lowering the device onto the pipe and by pressing the fixing shoes together and against the pipe by using the power device of the sleeve.

The cleaning device of the invention makes the quick use and sealing of the invention possible and also ensures that the sleeve is secure and its operation reliable. Additionally the cleaning device efficiently prevents impurities from getting into the pipe, which for its part prevents new accidents from occuring.

The sealing sleeve of the invention makes it possible to seal the safety valve into the pipe sufficiently securely so that the contents of the pipe are not released through the safety valve into its surroundings, and this also makes it possible to leave the safety valve in place without problems for even a longer period of time without it leaking and/or breaking.

The support system of the invention essentially increases the tightness of the roll of band and makes it possible to use the safety valve in blocking pipes, which are big in size and/or when the pressure is high. The support system is also an extra factor in making sure the safety valve is tight, which is important especially when dealing with inflammable liquids and gases, because leaking gas/liquid may create the risk of an explosion when the pipe is welded, for example.

The band of the invention increases the tightness of the roll of band especially in large pipes and under high pressure in which the roll of band is pressed against the support systems and does not fully retain its plate-like appearance whereupon gaps are formed between the bands, which are closed by the sealing flange formed at edge of the band on the pressure side. Because this way the band is sufficiently tight in itself, the bands do not need to be glued to each other to improve the tightness and stiffness, which makes it possible to open the roll of band simply and quickly. Some sealing substance, such as grease, can be conducted into the hollow inside the band.

The operation of the safety valve of the invention is realiable and it is easy and quick to install around the pipe, these qualities being especially necessary when using the safety valve for example when there is a risk of oil disaster. The safety valve can be left in place for a long period of time, for example when lengthy repair work is needed. The power and drive mechanisms can all easily be constructed in the same way, for example hydraulically or electrically, in which case one power source can be used. The safety valve can easily be operated automatically, in which case it is easy and safe to use and all that is needed then to close the pipe is getting the safety valve on top of the pipe. In disaster situations automatic operation is important, because the area surrounding the pipe may be on fire, contaminated etc. in which case no human can work there. Conditions may also be so poor that the likelyhood of human error increases, in which case the only secure way to block the pipe is to do it as automatically as possible. The delivery may be made by helicopter for example from the air, in which case the installation work can be carried out sufficiently quickly after an accident has occured.

BRIEF DESCRIPTION OF THE DRAWINGS

The invention is described in detail below with the help of application examples referring to the enclosed drawings in which picture 1 shows the safety valve of one application of the invention installed around the pipe, picture 2 shows the safety valve of one application of the invention in which the winding device has been pushed into the pipe, picture 3 shows the safety valve in one application of the invention in which the pipe has been blocked by a band wound in the pipe, picture 4 shows the winding device, drilling device and frame of the drilling device of one application of the invention, picture 5 shows the sealing sleeve of one application of the invention seen from a right angle to the pipe, picture 6 shows the sealing sleeve of one application of the invention from an other angle, picture 7 shows the cleaning device of one application of the invention, picture 8 shows the sleeve of one application of the invention.

DETAILED DESCRIPTION OF THE INVENTION

Figure 1:
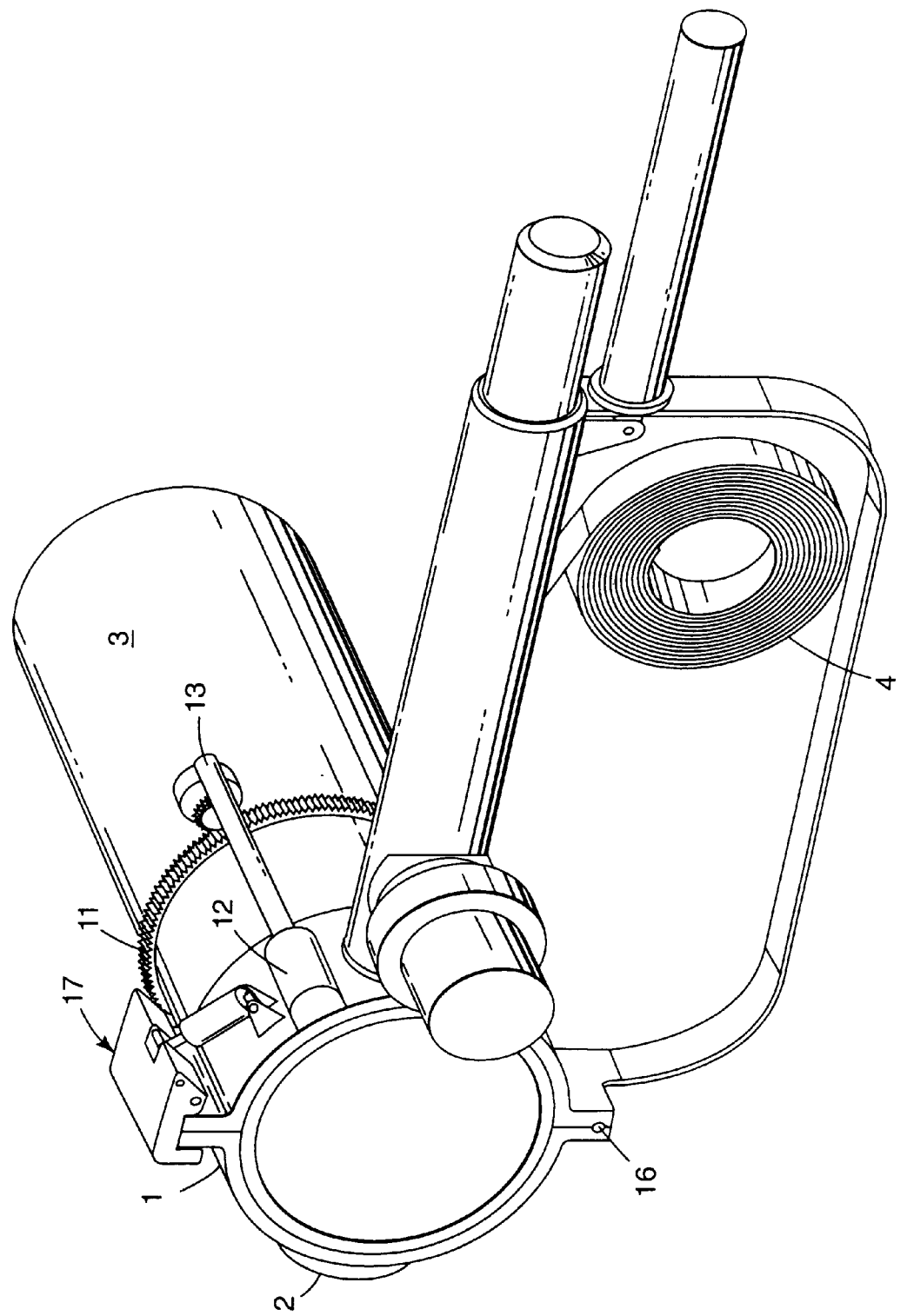
Figure 2:
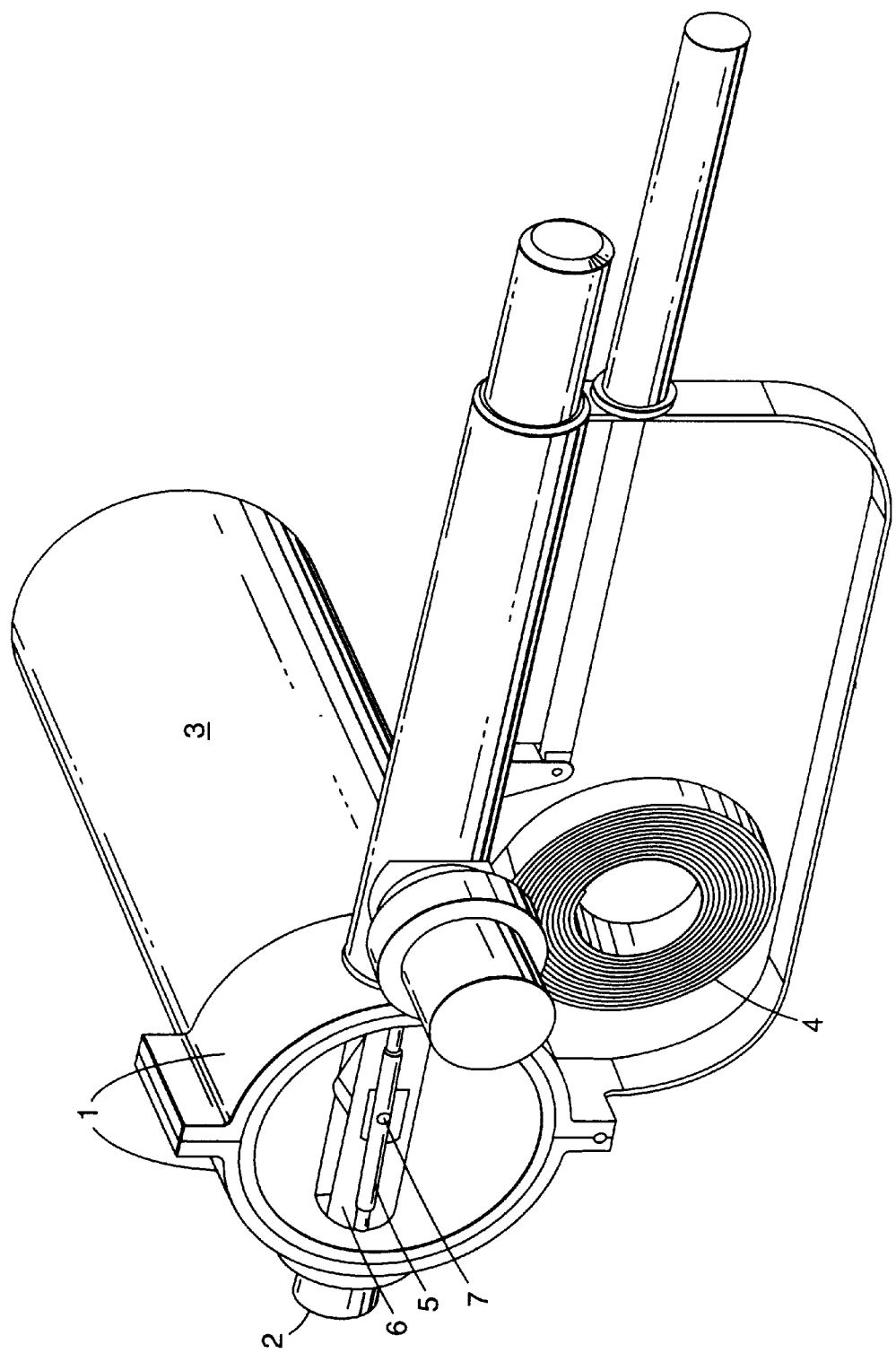
Figure 3:
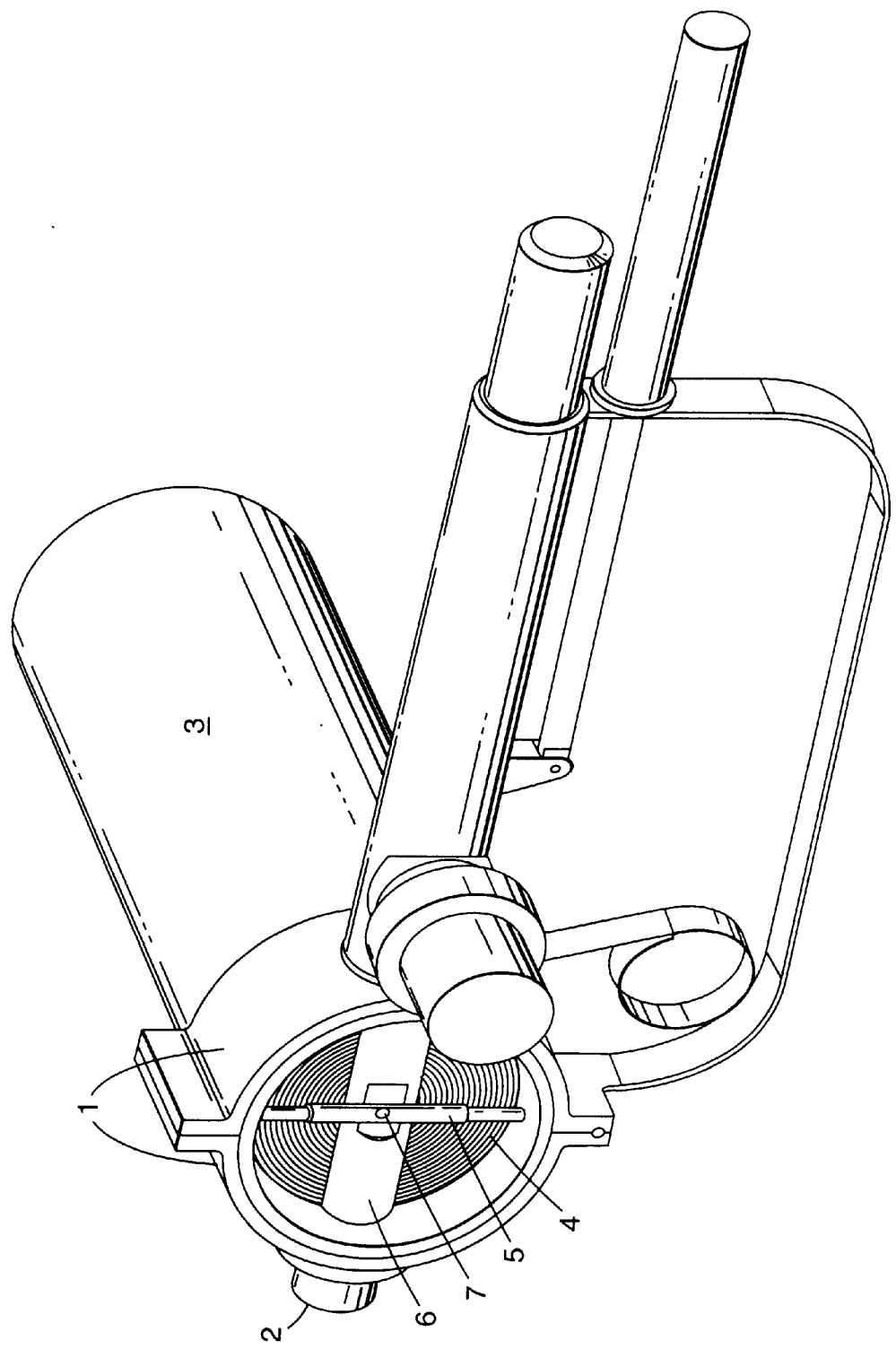
Figure 4:
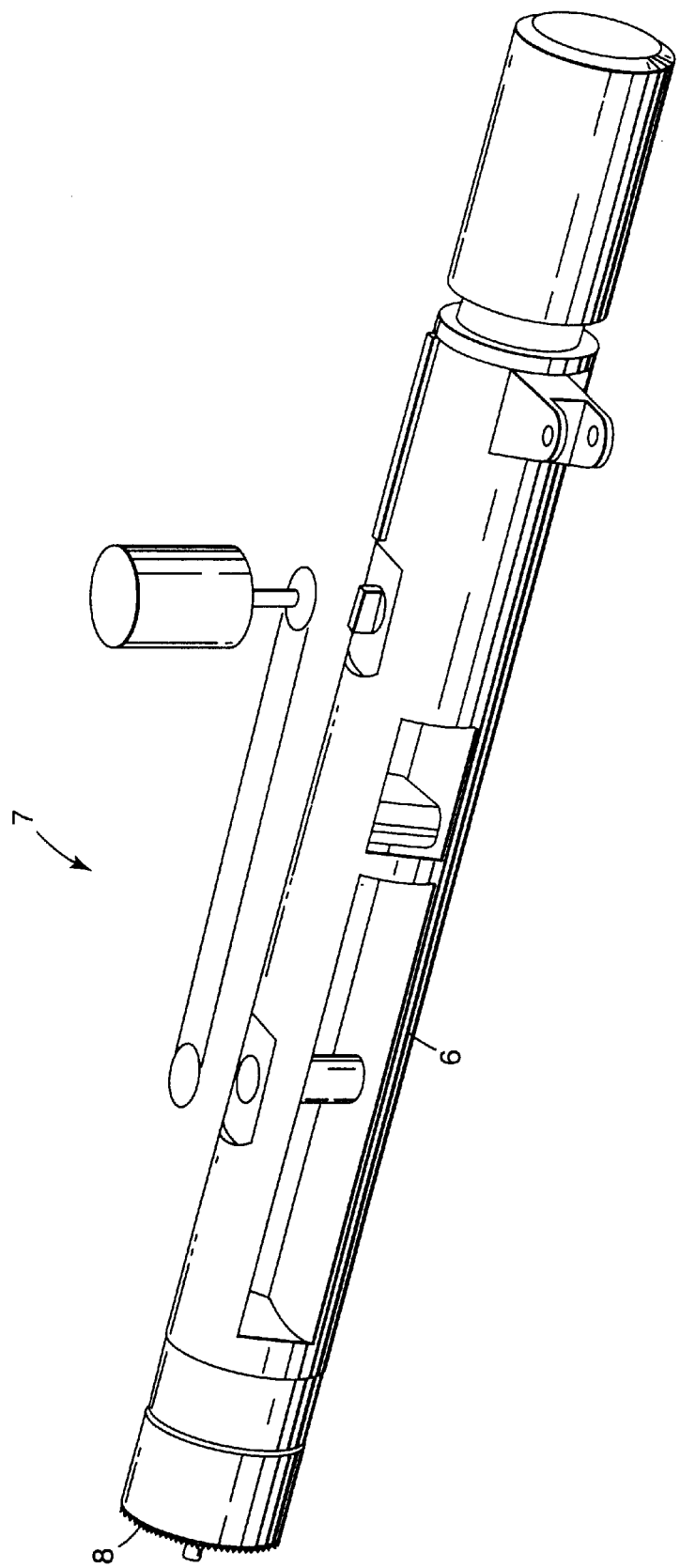
Figure 5:
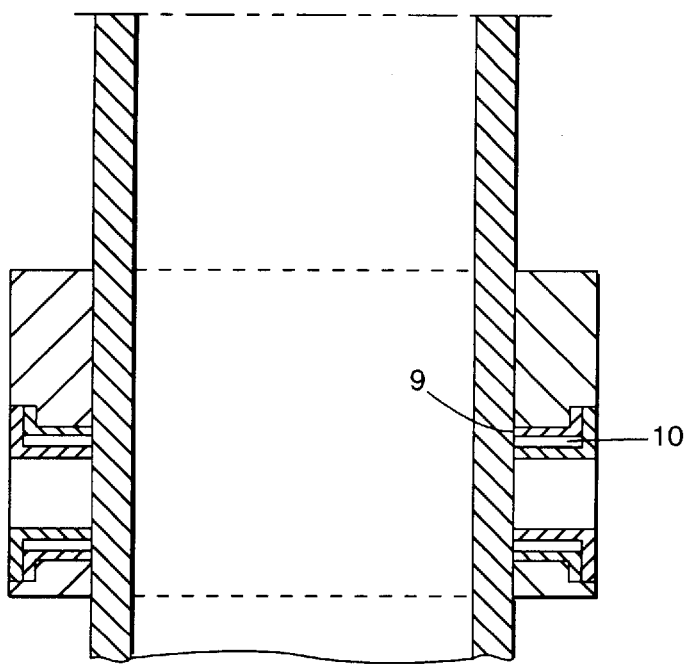
Figure 6:
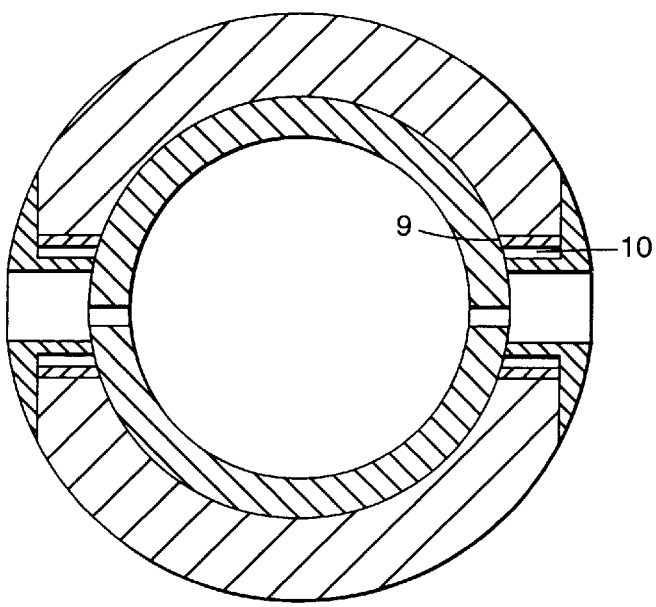
Figure 7:
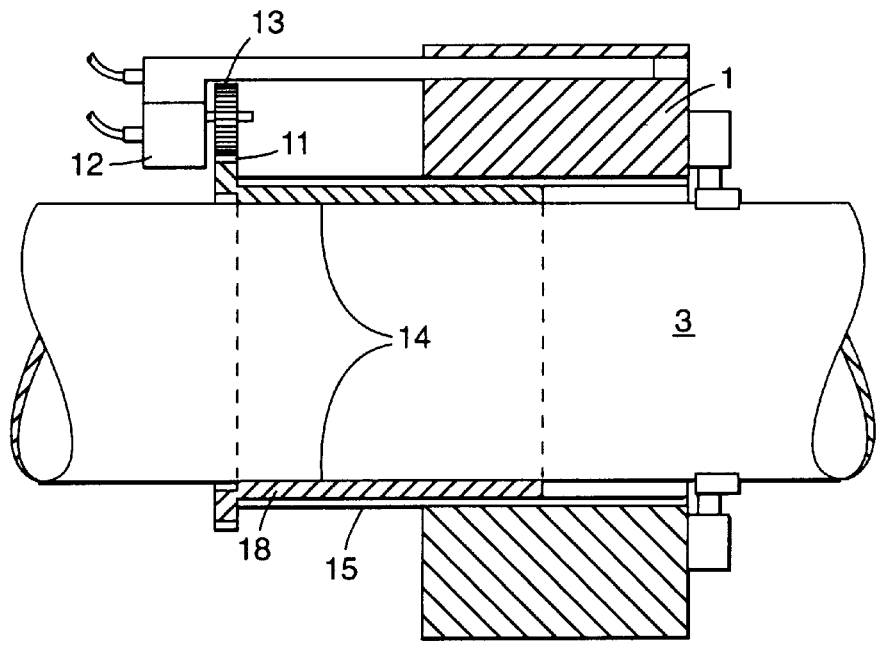
Figure 8:
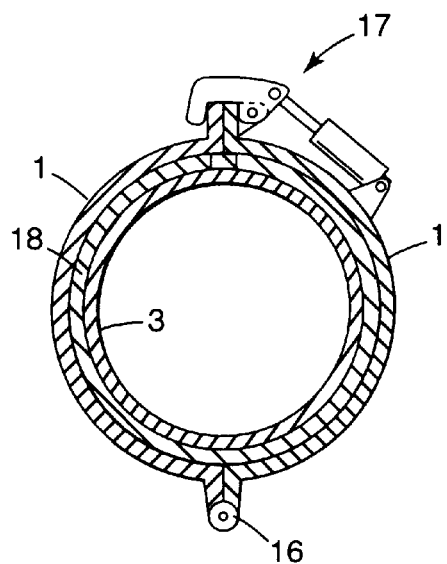

The safety valve includes a drilling device 8, the frame of the drilling device 6 to which also the winding device 7 is joined, its axle can for example be arranged in the middle of an elongated, link-like hole situated in the frame. The frame of the drilling device is fixed to the sleeve.

The safety valve is joined to the pipe by means of the sleeve 3. A hole is made in the pipe with the drilling device 8, into which the winding device 7 is pushed, the winding device is used to wind a band 4 from outside the pipe to form a roll of band filling the inner diameter of the pipe, which will block the flow in the pipe. The roll of band can in accordance with one application of the invention be supported by support systems. The drilling device can for example be pushed out of the pipe through an other hole made in the opposite wall of the pipe in which case the drilling device is not in the way when the roll of band is being wound. The drilling device and winding device can be equipped with for example an electric motor, hydraulic systems or power from a source outside the pipe can be used mechanically through the frame to the drilling and winding devices. Any generally known techniques can be used in the transmission of power and/or as power sources. The holes made in the pipe are sealed according to one application of the invention with sealing sleeves.

Picture 1 shows a safety valve installed around a pipe 3 with its cleaning device and the power device of the sleeve. The cleaning device and power device are not shown in pictures 2 and 3. Picture 2 shows the same safety valve in which holes have been drilled into the pipe with the drilling device 8 and the winding device 7 has been pushed into the pipe. In picture 2 the turning support system connected to the frame of the drilling device in parallel to the frame of the drilling device. Picture 3 shows the safety valve of pictures 1 and 2 in which the winding device has been used to wind a roll of band to block the pipe. In picture 3 the support system has turned to support the roll of band perpendicularily to the frame of the drilling device.

The safety valve is fixed to the pipe with fixing shoes 1, which are hinged 16 to each other and squeezed around the pipe 3 with a power device 17, for example hydraulically or by some other similar method. The fixing shoes are advantageously semicircular and proportioned to fit securely around the pipe. The inner surface of the fixing shoes can for example be roughened so that their grip on the pipe will be tight and secure. The purpose of the fixing shoes is to form a firm sleeve, from which the drilling and winding devices can operate. By using the support of the fixing shoes the devices can additionally be sealed onto the pipe so tightly that no liquid or gas escapes. Because of the fixing shoes the installation of the safety valve is easy and its operation is protected from outside impurities etc.

The winding device 7 and drilling device 8 with its frame 6 are joined to the other fixing shoe. The frame of the drilling device, to which the winding device is also joined, can be link-shaped so that the axle of the winding device winding the band 4 is arranged into the space formed by the link, whereupon the band can be rolled up in between the two halves of the frame. Both the drilling device situated at the end of the frame as well as the winding device use some kind of a drive mechanism. The devices can be operated for example electrically, hydraulically or mechanically. The mentioned drive mechanisms are, however, arranged so that the outside surface of the frame is the shape of the pipe and fits in the hole drilled by the drilling device. A cup 2 can be formed into the other fixing shoe opposite the fixing of the drilling device, into which the drilling device can be drilled so that the frame of the drilling device passes parallel to the diameter of the pipe through the pipe and the winding device is situated at the center point of the pipe while the frame of the drilling device forms a support joining the pipe in two places, for both the winding device as well as for the roll of band connected to it.

Pictures 5 and 6 show the sealing sleeves of one application of the invention, which have been joined to the fixing shoes. Picture 5 shows the sealing sleeves when the pipe is at a right angle and picture 6 shows the sealing sleeves parallel to the pipe. The sealing sleeves can be joined to the fixing shoes 1 or to the frame 6 of the drilling device. Essentially the sealing sleeves surround the holes made in the pipe and form a tight boundary surface between the pipe and the safety valve. Advantageously there may be one or more sealing sleeves. Advantageously all the holes made in the pipe are sealed with sealing sleeves. The holes in the pipe may be holes made for the winding device 7 and possible support systems.

The pressure in the pipe can be directed through the sealing sleeves to for example different parts of the safety valve so that the pressure in the whole valve is the same as the pipe, only in this case the outer casing of the safety valve must be sealed. Advantageously the sealing sleeve is formed by a sleeve-like blade surface 9, which is pressed to the surface of the pipe insulating the inside of the sleeve from the outside so it is liquid and/or gas proof. If necessary several sleeve-like blade surfaces one within the other can be used and the space 10 between them can be pressurized for example with liquid or gas, or it can be filled with some sealing substance, for example grease. The sealing sleeves can be joined to the fixing shoes so that they are pressed against the pipe when the fixing shoes are squeezed around the pipe.

Picture 7 shows the cleaning device in one application of the invention including the drive mechanism 13, gear 11 and cleaning surfaces 14. The cleaning surfaces can, for example, be roughened or covered with some cleansing material. The drive mechanism includes a motor 12, which with the help of a cog 13 turns the gear and thus also the cleaning ring and cleaning surfaces. The cleaning surfaces are placed against the inner surfaces of the fixing shoes 1 so that the joint surface of the cleaning surfaces and the fixing shoes has threads 15. When the fixing shoes are pressed by the power device 17 around the pipe, the cleaning surfaces are turned with the drive mechanism against the pipe, whereupon the cleaning surfaces revolve from under the fixing shoes. When the cleaning surfaces have revolved from under the fixing shoes, the fixing shoes are pressed against the pipe. The cleaning surfaces can also be placed under the fixing shoes into a space reserved for them, whereupon the fixing shoes can be squeezed to nearly their final tightness while the cleaning surfaces are free to move under the fixing shoes. As far as the safety valve of the invention is concerned it is not important how the cleaning device has been implemented, the important factor is that the safety valve can be placed on top of the pipe and can from this position clean the area of the pipe surface needed by the fixing shoes. In that case the operation of the safety valve can be made automatic and it can be installed for example by helicopter or crane etc. and no immediate human presence is necessary.

Picture 8 shows the sleeve of one application of the invention in which the fixing shoes 1 have been squeezed around the pipe with a hinge 16 and a power device 17. The ring segments of the cleaning device are under the fixing shoes.

The purpose of the application examples is to illustrate the invention with no intention of limiting it in any way.

What is claimed is:

1. A safety valve to stop flow in a flow pipe, the safety valve comprising:

a securing device for connecting the safety valve to the outside surface of the pipe, the securing device comprises:

a seat comprising two substantially semicircular fixing shoes, connected by a joint to each other and provided with a power device to press the fixing shoes around the pipe;

a cleaning device disposed between the fixing shoes and the pipe and rotated between the pipe and the fixing shoes for cleaning the pipe surface therebetween; and a drilling device having a frame, connected to the securing device, to make a hole in the flow pipe, wherein the frame of the drilling device is fixed to one fixing shoe;

a winding device fixed to the frame of the drilling device and fixed to one fixing shoe, having at least a portion of the winding device disposed within the interior of the pipe allowing a band to be rolled from the exterior to the interior of the pipe about the interior portion of the winding device for blocking and regulating fluid flow through the interior or the pipe, wherein the band is wound with the winding device.

2. The safety valve of claim 1, wherein the safety valve includes a cleaning device to clean the outside surface of the pipe forming the area needed for the seat to be fixed to the pipe.

3. The safety valve of claim 2, wherein the cleaning device includes a cleaning ring, which consists of two ring segments placed on the inner surfaces of the fixing shoes the inner surfaces of the ring segments being provided with cleansing surfaces and an drive mechanism to turn the cleaning ring around the pipe in order to clean the outside surface of the pipe.

4. The safety valve of claim 2, wherein the drive mechanism includes a gear joined to the cleaning ring and an operating motor, which is joined so it is mainly immobile to the other fixing shoe tangentially to the surface of the pipe, which includes a cog wheel, and the operating motor has been arranged to turn the gear and the cleaning ring by means of the cog wheel and that the outer surface of the cleaning ring is joined by threads against the inner surfaces of the fixing shoes so that when the cleaning ring turns and cleans the surface of the pipe it moves from under the shoes.

5. The safety valve of claim 1, wherein the seat includes a sealing sleeve to seal the frame of the drilling device to the outer surface of the pipe.

6. The safety valve of claim 5, wherein the sealing sleeve is connected to the fixing shoe to which the drilling device is connected.

7. The safety valve of claim 5, wherein the other fixing shoe includes a sealing sleeve, which seals the fixing shoe to the outer surface of the pipe around the drilling when a hole is drilled through wall of the pipe.

8. The safety valve of claim 5, wherein the sealing sleeve includes at least one sleeve-like blade surface, which is placed so it is pressed against the outer surface of the pipe so it is pressure proof when the fixing shoes are squeezed around the pipe.

9. The safety valve of claim 5, wherein the sealing sleeve includes at least two sleeve-like blade surfaces one inside the other that can be pressed against the outer surface of the pipe and a gap between them can be pressurized with gas and liquid.

10. The safety valve claim 1, wherein the safety valve is equipped with at least one support system mainly crosswise to the pipe to support the band wound into the pipe from the opposite side in relation to a pressure side.

11. The safety valve of claim 10, wherein the support system is connected by joint to the frame of the drilling device and provided with a power device to turn the support system crosswise to the frame and pipe after the frame of the drilling device has been pushed into the pipe.

12. The safety valve of claim 10, wherein the support system is equipped with a drilling system to drill the support system through the wall of the pipe into the pipe.

13. The safety valve of claim 10, wherein the support system is placed in the frame of the drilling device and consists of a telescopic pin system that pushes out.

14. The safety valve of claim 1, wherein the band includes two bands on top of each other joined at the edges and a sealing flange formed as an extension of the edge.

15. The safety valve of claim 14, wherein a sealing flange has been formed as an extension of both edges.

16. The safety valve of claim 1, wherein the winding device and the cleaning device are operated by external operators and at least mounted in part to the pipe, the drilling device and the fixing shoes.

* * * * *